(12) United States Patent
Kono

(10) Patent No.: US 11,060,911 B2
(45) Date of Patent: Jul. 13, 2021

(54) SPECTROSCOPIC MEASUREMENT DEVICE AND SPECTROMETRY SYSTEM

(71) Applicant: HAMAMATSU PHOTONICS K.K., Hamamatsu (JP)

(72) Inventor: Makoto Kono, Hamamatsu (JP)

(73) Assignee: HAMAMATSU PHOTONICS K.K., Hamamatsu (JP)

( * ) Notice: Subject to any disclaimer, the term of this patent is extended or adjusted under 35 U.S.C. 154(b) by 0 days.

(21) Appl. No.: 16/348,172

(22) PCT Filed: Nov. 13, 2017

(86) PCT No.: PCT/JP2017/040763
§ 371 (c)(1),
(2) Date: May 8, 2019

(87) PCT Pub. No.: WO2018/088556
PCT Pub. Date: May 17, 2018

(65) Prior Publication Data
US 2019/0368930 A1      Dec. 5, 2019

(30) Foreign Application Priority Data
Nov. 14, 2016  (JP) .............................. JP2016-221750

(51) Int. Cl.
*G01J 3/08*      (2006.01)
*G01J 3/42*      (2006.01)
*G01N 21/27*     (2006.01)

(52) U.S. Cl.
CPC .  *G01J 3/08* (2013.01); *G01J 3/42* (2013.01); *G01N 21/27* (2013.01)

(58) Field of Classification Search
CPC .... G01J 3/08; G01J 3/42; G01J 3/0291; G01J 3/0202; G01J 1/0271; G01J 3/504;
(Continued)

(56) References Cited

U.S. PATENT DOCUMENTS 5,139,745 A * 8/1992 Barr ....................... G01N 21/76
250/361 C
5,307,155 A * 4/1994 Ando .................... G01N 21/01
356/244

(Continued)

FOREIGN PATENT DOCUMENTS

CN        1377460 A    10/2002
CN      101023339 A     8/2007
(Continued)

OTHER PUBLICATIONS

International Preliminary Report on Patentability dated May 23, 2019 for PCT/JP2017/040763.

*Primary Examiner* — Mohamed K Amara
(74) *Attorney, Agent, or Firm* — Faegre Drinker Biddle & Reath LLP

(57) ABSTRACT

A spectroscopic measurement device emits light to a measurement target and measures the measurement light output from the measurement target in accordance with the light emission. A spectroscopic measurement device includes: a first housing having a light shielding property and configured to house a light source that emits light and having a first opening through which the light emitted from the light source passes; a second housing having a light shielding property and having a second opening through which the measurement light passes and configured to house a spectrometer that receives the measurement light that has passed through the second opening; and an arm member configured to relatively rotatably join the first housing and the second housing. A proximal end side of the arm member is rotatably joined with the second housing. The first housing is attached to a distal end side of the arm member.

14 Claims, 12 Drawing Sheets

(58) Field of Classification Search
CPC .......... G01N 21/27; G01N 2021/1742; G01N 2201/0224; G01N 2021/4757; G01N 2021/1744; G01N 21/474; G01N 21/01
See application file for complete search history.

(56) References Cited

U.S. PATENT DOCUMENTS

| | | | | |
|---|---|---|---|---|
| 5,641,960 | A * | 6/1997 | Okubo | G01B 11/022 250/307 |
| 5,898,181 | A | 4/1999 | Vurens | |
| 6,324,298 | B1 * | 11/2001 | O'Dell | G01N 21/9501 257/E21.53 |
| 6,549,275 | B1 * | 4/2003 | Cabuz | G01N 15/1456 356/39 |
| 6,809,826 | B2 * | 10/2004 | Robertson | B82Y 15/00 356/246 |
| 7,397,036 | B2 * | 7/2008 | Robertson | G01N 21/645 250/368 |
| 7,623,225 | B2 * | 11/2009 | Robertson, Jr. | G01J 3/02 356/213 |
| 8,189,199 | B2 * | 5/2012 | Robertson, Jr. | G01J 3/0218 356/440 |
| 8,345,235 | B2 * | 1/2013 | Hoult | G01J 3/42 356/326 |
| 8,547,555 | B1 * | 10/2013 | Bradley | G01J 3/0202 356/445 |
| 8,646,344 | B2 * | 2/2014 | Israelachvili | G01N 3/04 73/864.91 |
| 8,730,466 | B2 * | 5/2014 | Ashmead | G01J 3/0218 356/244 |
| D739,771 | S * | 9/2015 | Jablonski | G01J 3/0291 D10/81 |
| 9,128,062 | B2 * | 9/2015 | Palmieri | G01N 21/87 |
| 9,869,636 | B2 * | 1/2018 | Mander | G01N 21/01 |
| 10,161,872 | B2 * | 12/2018 | Sasayama | G01N 21/645 |
| 2001/0046047 | A1 * | 11/2001 | Ryer | G01J 3/0291 356/328 |
| 2002/0015146 | A1 * | 2/2002 | Meeks | G01B 11/065 356/73 |
| 2003/0143752 | A1 * | 7/2003 | Feldsine | G01N 21/763 436/164 |
| 2005/0117204 | A1 * | 6/2005 | Kinoshita | G02B 21/362 359/368 |
| 2007/0258093 | A1 | 11/2007 | Sieck et al. | |
| 2008/0013169 | A1 * | 1/2008 | Korpinen | G02B 21/14 359/385 |
| 2012/0206714 | A1 * | 8/2012 | Higgins | G01J 3/0297 356/51 |
| 2012/0295249 | A1 * | 11/2012 | Cherubini | G01N 35/028 435/5 |
| 2014/0106470 | A1 * | 4/2014 | Kopacka | G01N 21/6428 436/501 |
| 2015/0208957 | A1 * | 7/2015 | Zhang | G01J 3/0237 600/322 |
| 2015/0233760 | A1 * | 8/2015 | Kielhorn | G01N 21/03 356/326 |
| 2016/0286197 | A1 * | 9/2016 | Schwarz | A61B 90/361 |

FOREIGN PATENT DOCUMENTS

| | | |
|---|---|---|
| CN | 104237544 A | 12/2014 |
| CN | 105259144 A | 1/2016 |
| FR | 2623621 A1 | 5/1989 |
| JP | S54-110886 A | 8/1979 |
| JP | H03-25348 A | 2/1991 |
| JP | 2003-510560 A | 3/2003 |
| JP | 2003-510831 A | 3/2003 |
| JP | 3446120 B2 | 9/2003 |
| JP | 2007-198597 A | 8/2007 |
| JP | 2014-102217 A | 6/2014 |
| JP | 2015-028466 A | 2/2015 |
| JP | 2016-052881 A | 4/2016 |
| WO | WO-01/06232 A2 | 1/2001 |
| WO | WO 01/023871 A1 | 4/2001 |
| WO | WO 2005/015187 A1 | 2/2005 |

* cited by examiner

SPECTROSCOPIC MEASUREMENT DEVICE AND SPECTROMETRY SYSTEM

TECHNICAL FIELD

One aspect of the present invention relates to a spectroscopic measurement device and a spectrometry system.

BACKGROUND ART

An apparatus described in Patent Literature 1 is known as an example of a conventional spectroscopic measurement device. In the apparatus described in Patent Literature 1, light is emitted onto a specimen (object to be measured) mounted on a specimen table, and the reflected light reflected by the specimen according to the irradiation is detected by an integrating sphere, whereby a specimen The optical properties of the specimen are measured.

CITATION LIST

Patent Literatures

Patent Literature 1: Japanese Patent No. 3446120

SUMMARY OF INVENTION

Technical Problem

In the spectroscopic measurement device described above, spectrometry with the light emission angle with respect to the measurement target varied as desired might be required in some cases. Further, in recent years, the spectroscopic measurement device is often brought to fields (actual growing site when the measurement target is a plant, for example) for spectrometry in addition to the inside of the laboratory, it is becoming further desirable that spectroscopy be conveniently performed.

In view of the above, one aspect of the present invention to provide a spectroscopic measurement device and a spectrometry system capable of easily conducting spectrometry of emitting light to a measurement target at a desired light emission angle.

Solution to Problem

A spectroscopic measurement device according to one aspect of the present invention is a spectroscopic measurement device configured to emit light onto a measurement target to measure measurement light output from the measurement target corresponding to the light emission, the device including: a first housing configured to house a light source that emits light and having a first opening through which the light emitted from the light source passes; a second housing having a second opening though which the measurement light passes and configured to house a spectrometer that receives the measurement light that has passed through the second opening; and an arm member configured to relatively rotatably join the first housing and the second housing, in which a proximal end side of the arm member is rotatably joined to the second housing, and the first housing is attached to a distal end side of the arm member.

In this spectroscopic measurement device, for example, the arm member is rotated such that its distal end side swings around its proximal end side in a state where the second housing is brought into contact with the measurement target, so that the relative angle of the first housing with respect to the second housing can be changed, eventually enabling a light emission angle with respect to the measurement target to be changed as desired. That is, this makes it possible to easily perform spectrometry of emitting light to a measurement target at a desired light emission angle.

In the spectroscopic measurement device according to one aspect of the present invention, the proximal end side of the arm member may be rotatably joined to the second housing via a rotation axis along an axis intersecting an optical axis of the measurement light output from the measurement target. With this configuration, it is possible to suppress elongation of the optical path of the light from the light source to the measurement target (distance between the light source and the measurement target) in a case where the arm member is rotated to change the light emission angle with respect to the measurement target.

In the spectroscopic measurement device according to one aspect of the present invention, the proximal end side of the arm member may be rotatably joined to the second housing via a rotation axis along an axis intersecting an optical axis of the measurement light output from the measurement target and intersecting an optical axis of the light emitted onto the measurement target. With this configuration, it is possible to further suppress elongation of the optical path of the light from the light source to the measurement target in a case where the arm member is rotated to change the light emission angle with respect to the measurement target.

In the spectroscopic measurement device according to one aspect of the present invention, the first housing may be provided so as to be slidable in an extending direction of the arm member on a distal end side of the arm member. In this configuration, by sliding the first housing so as to come closer to the measurement target in the extending direction of the arm member, it is possible to shorten the optical path of the light from the light source to the measurement target.

In the spectroscopic measurement device according to one aspect of the present invention, the second housing may include a position regulator configured to regulate the position of the measurement target. With this configuration, it is possible to use the position regulator to reliably hold the measurement target.

In the spectroscopic measurement device according to one aspect of the present invention, the arm member may be able to relatively rotate the first housing and the second housing from a first state in which an angle between a optical axis of the light emitted on the measurement target and a optical axis of the measurement light output from the measurement target is an acute angle to a second state in which the optical axis of the light to be emitted on the measurement target and the optical axis of the measurement light output from the measurement target are coaxial. In this case, the reflected light, that is light reflected by the measurement target or fluorescence generated by the measurement target can be measured as measurement light in the first state. In the second state, transmitted light, that is, light transmitted through the measurement target or the fluorescence generated by the measurement target can be measured as measurement light.

The spectroscopic measurement device according to one aspect of the present invention may include: a first light shielding body having a light shielding property and configured to cover, in the first state, the optical path of light from the first opening to the measurement target, the first housing, and the arm member; and a second light shielding body having a light shielding property and configured to cover, in the second state, the optical path of the light from the first opening to the measurement target, the first housing, and the arm member, in cooperation with the first light shielding body. With this configuration, it is possible to effectively shield external light in each of the first state and the second state.

The spectroscopic measurement device according to one aspect of the present invention may include a first light shielding body having a light shielding property and configured to cover the optical path of light from the first opening to the measurement target, the first housing, and the arm member. With this configuration, it is possible to effectively shield external light.

A spectrometry system according to one aspect of the present invention includes: the above-described spectroscopic measurement device; a measurement result transmission unit provided in the spectroscopic measurement device and configured to transmit a measurement result of the spectrometer; and a measurement result processing device configured to receive the measurement result of the spectrometer from the measurement result transmission unit directly or through a network and perform processing of the measurement result.

Since this spectrometry system includes the above spectroscopic measurement device, it is possible to obtain the above-described effect of being capable of performing spectrometry of emitting light to the measurement target at a desired light emission angle. Furthermore, it is possible to have a configuration in which the spectroscopic measurement device has no measurement result processing function, leading to downsizing of the spectroscopic measurement device.

The spectrometry system according to one aspect of the present invention may further include: a control terminal configured to generate a control signal for controlling the light source in accordance with operation of an operator and transmit the control signal; a control signal reception unit provided in the spectroscopic measurement device and configured to receive the control signal from the control terminal directly or through a network; and a light source control unit provided in the spectroscopic measurement device and configured to control the light source on the basis of the control signal received by the control signal reception unit. With this configuration, it is possible to remotely operate the light source.

Advantageous Effects of Invention

According to one aspect of the present invention, it is possible to provide a spectroscopic measurement device and a spectrometry system capable of easily performing spectrometry of emitting light to a measurement target at a desired light emission angle.

DESCRIPTION OF EMBODIMENTS

Figure 1:
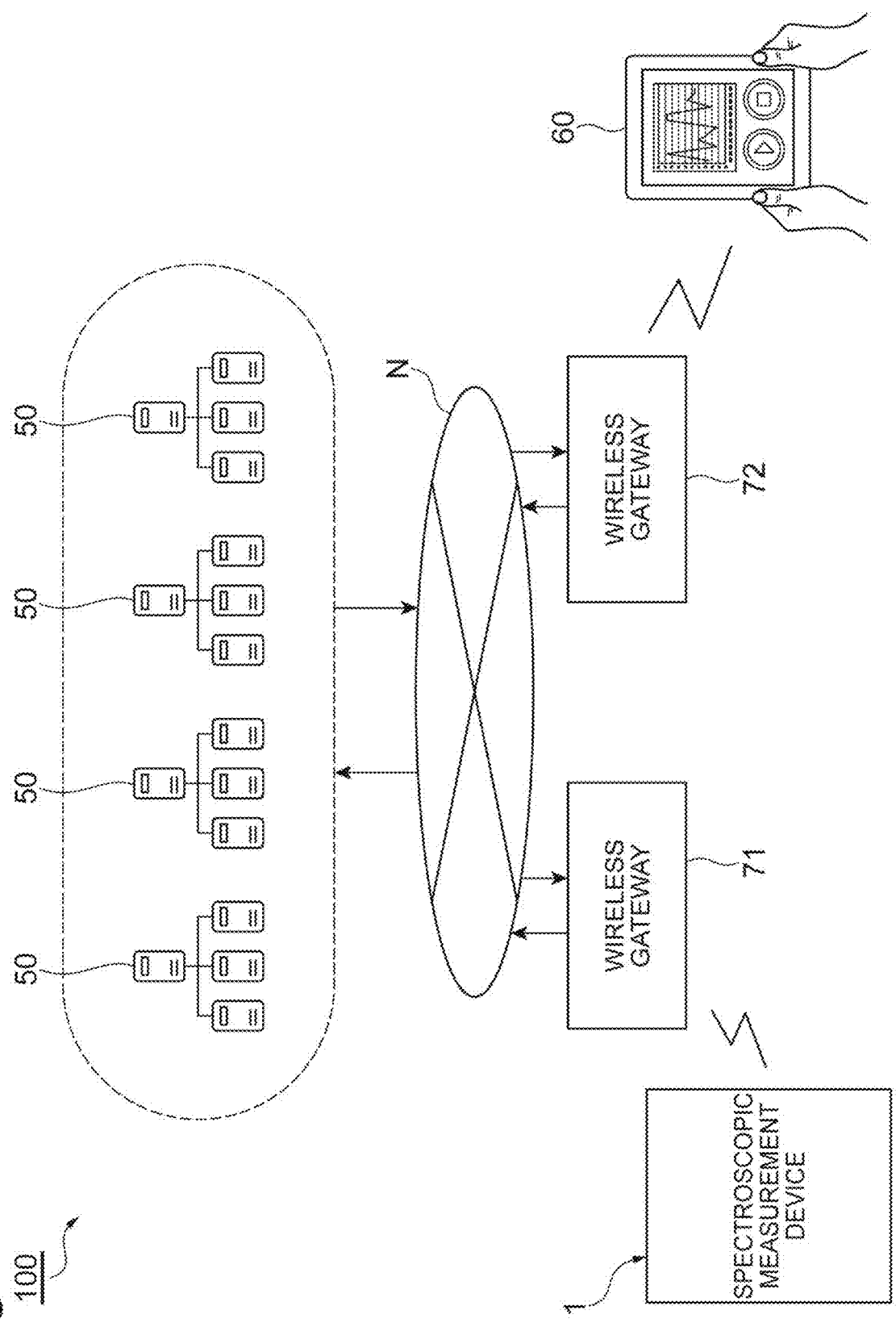
FIG. 1 is a configuration diagram illustrating a spectrometry system according to a first embodiment.

Hereinafter, one embodiment of the present invention will be described in detail with reference to the accompanying drawings. In the following, the same or equivalent elements are denoted by the same reference numerals, and duplicate explanation is omitted.

First Embodiment

As illustrated in FIG. 1, a spectrometry system 100 according to a first embodiment includes: a spectroscopic measurement device 1; a data processing server 50; and a mobile information terminal 60. The spectrometry system 100 has a configuration in which the spectroscopic measurement device 1, the data processing server 50, and the mobile information terminal 60 can perform data communication with each other via a network N.

Figure 2:
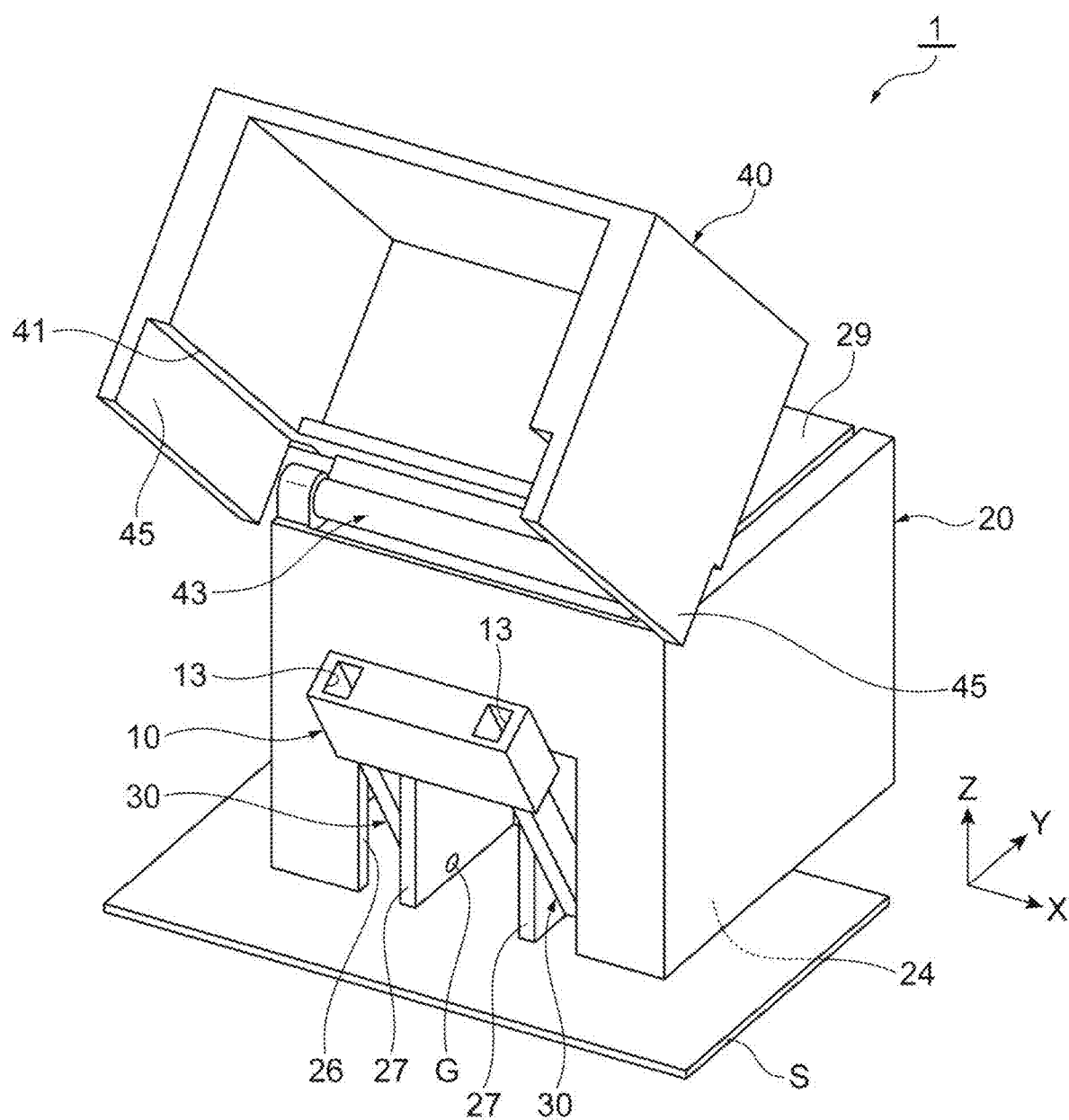
FIG. 2 is a perspective view illustrating a state where a first light shielding cover is open in the spectroscopic measurement device of FIG. 1.

First, a configuration of the spectroscopic measurement device 1 will be described. As illustrated in FIG. 2, the spectroscopic measurement device 1 is a mobile-type (portable-type) measurement device that emits light to a measurement target S and measures measurement light output from the measurement target S corresponding to the light emission. The spectroscopic measurement device 1 includes a first housing 10, a second housing 20, an arm member 30, and a first light shielding cover (first light shielding body) 40.

An example of the measurement target S is a plant, although not particularly limited. The measurement target S is also referred to as a sample or a specimen. The measurement target S may also be a substance in a form of liquid, powder, or gas, stored in a container, for example, in addition to a solid substance. In the following description, for the sake of convenience, a direction along the optical axis of the measurement light L2 (refer to FIG. 5) output from the measurement target S will be defined as a Z-direction, one direction perpendicular to the Z-direction will be defined as an X-direction, and a direction perpendicular to the Z-direction and the X-direction will be defined as the Y-direction.

Figure 3:
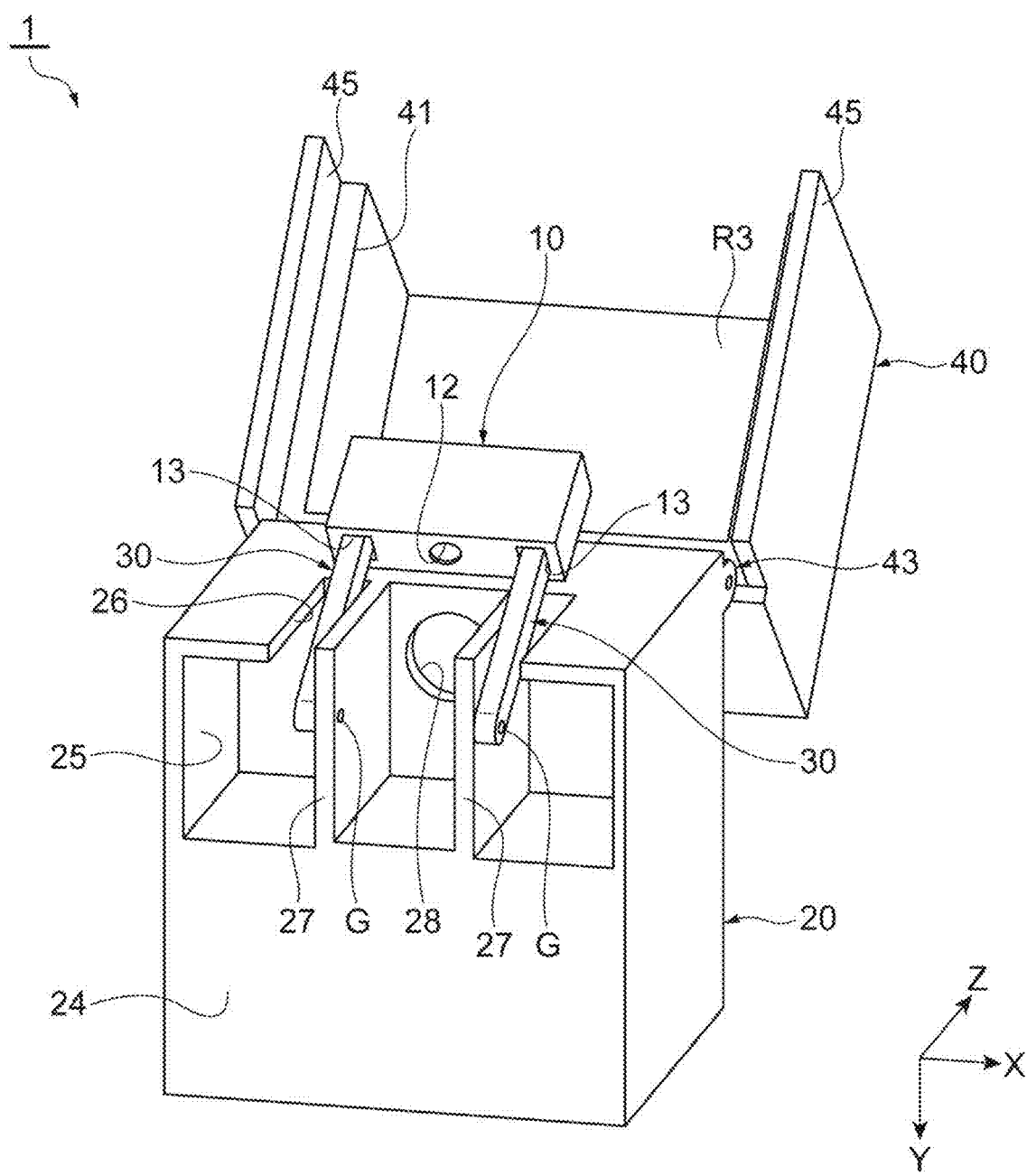
FIG. 3 is another perspective view illustrating a state where the first light shielding cover is open in the spectroscopic measurement device of FIG. 1.
Figure 5:
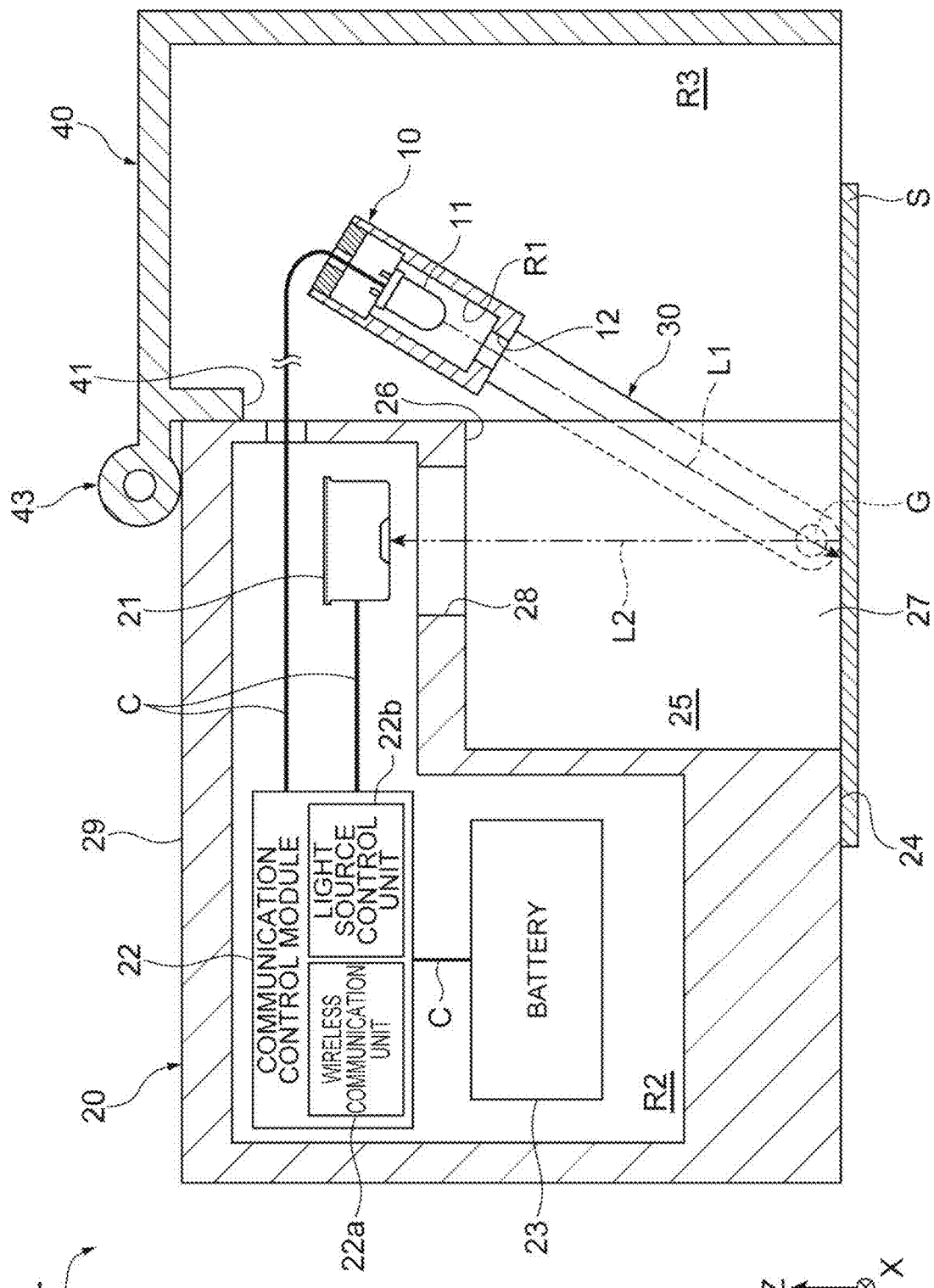
FIG. 5 is a diagram schematically illustrating a cross section taken along line V-V of FIG. 4.
Figure 6:
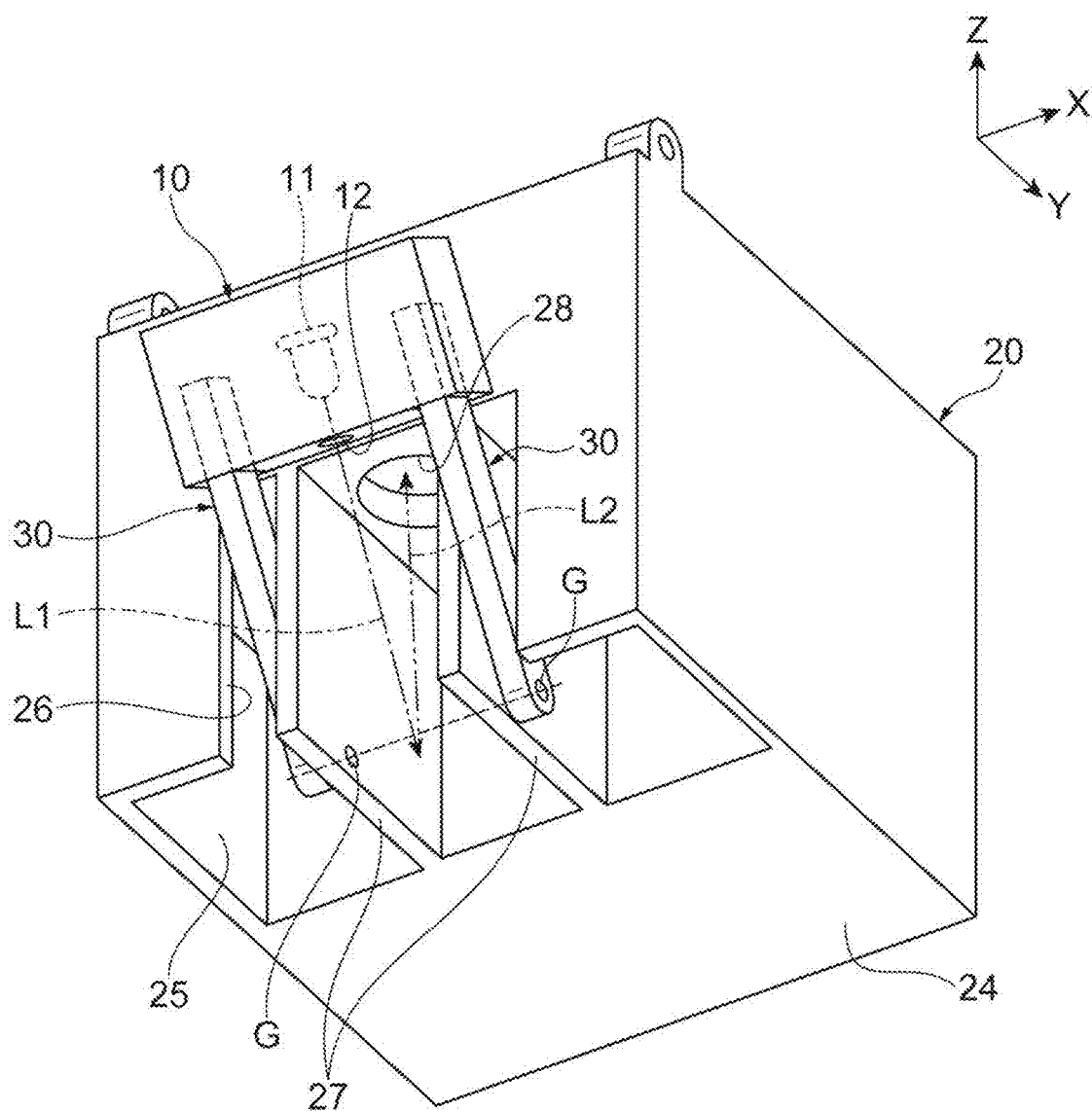
FIG. 6 is a perspective view illustrating an optical axis of the spectroscopic measurement device of FIG. 1.

As illustrated in FIGS. 3, 5, and 6, the first housing 10 is box member having a rectangular parallelepiped outer shape and having an internal space R1. The first housing 10 is a light projection block for projecting light L1 onto the measurement target S. The first housing 10 accommodates the light source 11 that emits the light L1, in the internal space R1. Examples of the light source 11 include a light emitting diode or a mini lamp (incandescent light bulb). The light source 11 is provided so as to be changeable in the first housing 10. Specifically, wavelength characteristics of the light L1 of the light source 11 are changeable in accordance with the measurement application. For example, when a light emitting diode in the ultraviolet range is used as the light source 11, it is possible to measure the fluorescence of the measurement target S. For example, when a white light emitting diode is used as the light source 11, it is possible to measure the chromaticity of the measurement target S.

A first opening 12 through which the light L1 emitted from the light source 11 passes is formed in the first housing 10. The first opening 12 having a circular cross section is provided on an optical axis of the light L1 from the light source 11 through an outer wall of the first housing 10. The first opening 12 is closed with a transparent member (such as an acrylic plate) that transmits the light L1. This makes it possible to prevent the measurement target S from directly coming in contact with the light source 11. Note that a lens may be disposed in the first opening 12 so as to facilitate enhancement of the ability to collect the light L1. The first housing 10 has a light shielding property. Here, the first housing 10 is formed of resin having high light shielding property so as not to obstruct wireless communication by a wireless communication unit 22a to be described below.

A through hole 13 through which the distal end side of the arm member 30 is slidably inserted is formed in the first housing 10. The through hole 13 has a sectional shape corresponding to the outer shape of the arm member 30. The through hole 13 here is formed in rectangular cross section at both end portions in the X-direction of the first housing 10.

As illustrated in FIGS. 2, 3, and 5, the second housing 20 is a box member having a rectangular parallelepiped outer shape and having an internal space R2. The second housing 20 is a light receiving block for receiving measurement light L2 from the measurement target S. The second housing 20 houses the spectrometer 21, the communication control module 22, and the battery 23 in the internal space R2.

The spectrometer 21 receives the measurement light L2, and analyzes the measurement light L2 separately for individual wavelengths. Examples of the spectrometer 21 applicable include a micro-spectrometer or a micro-spectroscopic sensor. The communication control module 22 includes a central processing unit (CPU). The communication control module 22 includes: a wireless communication circuit configured to implement a wireless communication function with the outside; and a driver circuit configured to implement a control function of the light source 11. The communication control module 22 is electrically connected to the light source 11, the spectrometer 21, and the battery 23 via a cable C such as a flexible cable having flexibility or elasticity.

The communication control module 22 functionally includes a wireless communication unit (measurement result transmission unit, control signal reception unit) 22a, and a light source control unit 22b. The wireless communication unit 22a receives a control signal (also referred to as a control command) for controlling the light source 11 from the outside by wireless communication. The wireless communication unit 22a transmits a signal related to the measurement result of the spectrometer 21 to the outside by wireless communication. The light source control unit 22b performs control (ON/OFF control, etc.) of the light source 11 on the basis of the control signal received by the wireless communication unit 22a. The battery 23 supplies electric power to the light source 11, the spectrometer 21, and the communication control module 22.

One of the pair of outer surfaces mutually opposed in the Z-direction in the second housing 20 constitutes an abutment surface (position regulator) 24 that directly or indirectly abuts the measurement target S. The abutment surface 24 directly or indirectly abuts the measurement target S so as to be pressed against the measurement target S to regulate the position of the measurement target S. The abutment surface 24, includes a rectangular recess 25. A cutout 26 is formed in the abutment surface 24 more toward one side in the Y-direction than the recess 25 to open the inside of the recess 25 to the one side in the Y-direction.

A pair of partition walls 27 facing each other in the X-direction is provided in the recess 25. The pair of partition walls 27 is provided upright on the bottom surface of the recess 25 so as to be aligned in the X-direction at a predetermined interval. The pair of partition walls 27 is disposed so as to be positioned within the cutout 26 when the cutout 26 is viewed in the Y-direction. The predetermined interval corresponds to the dimension in the width direction of the cuvette. The cuvette is a container formed of a transparent member (glass, resin, crystal, or the like) that transmits the light L and the measurement light L2. Between the pair of partition walls 27, a cuvette is inserted so as to be placed from one side in the Y-direction at the time of transmitted light measurement to be described below.

A second opening 28 through which the measurement light L2 passes is formed between the pair of partition walls 27 on the bottom surface of the recess 25. The spectrometer 21 is disposed at a position in proximity to the second opening 28 in the internal space R2 in a state where an entrance slit of the spectrometer 21 faces the second opening 28 in the Z-direction. The second opening 28 is closed with a transparent member (such as an acrylic plate) that transmits the measurement light L2. This makes it possible to prevent the measurement target S from directly coming in contact with the spectrometer 21. Note that a lens may be disposed in the second opening 28 so as to facilitate enhancement of the ability to collect the measurement light L2. The second housing 20 has a light shielding property. Here, the second housing 20 is formed of resin having high light shielding property so as not to obstruct wireless communication by a wireless communication unit 22a.

The arm member 30 relatively rotatably joins the first housing 10 and the second housing 20. The arm member 30 has a rectangular columnar outer shape. The first housing 10 is attached to the distal end side of the arm member 30 so that the light L1 is emitted toward the proximal end side of the arm member 30. Specifically, the distal end side of the arm member 30 is inserted into the through hole 13 of the first housing 10 in a state where the first opening 12 is directed to the proximal end side of the arm member 30 so that the optical axis of the light L1 passing through the first opening 12 is in the extending direction of the arm member 30. The distal end side of the arm member 30 is slidably fitted in the through hole 13. With this configuration, the first housing 10 is set slidable in the extending direction of the arm member 30 at the distal end side of the arm member 30 by the action of an external force of a certain level or more.

The proximal end side of the arm member 30 is rotatably joined with the second housing 20. More specifically, the proximal end side of the arm member 30 is rotatably joined to the X-direction outer wall surface of each of the pair of partition walls 27 via a rotation axis G being a joining mechanism.

The rotation axis G extends in the X-direction. Specifically, the rotation axis G extends along an axis orthogonal to the optical axis (Z axis) of the measurement light L2 output from the measurement target S, and extends along the axis orthogonal to the optical axis of the light L1 emitted onto the measurement target S. The rotation axis G is provided on the abutment surface 24 side of the partition wall 27 in the Z-direction and is provided in the central portion of the partition wall 27 in the Y-direction.

The arm member 30 constituted in this manner allows its distal end side to swing around its proximal end side on the YZ plane between the partition wall 27 and the inner surface of the cutout 26 in the X-direction in response to an external force of a certain level or more. The arm member 30 relatively rotatably joins the first housing 10 and the second housing 20 so as not to allow the distance from the first opening 12 to the measurement target S to change. The arm member 30 relatively rotatably joins the first housing 10 to the second housing 20 so that the position to be emitted with the light L1 on the measurement target S does not change (the focal point of the light L1 always becomes the same position) So as to be rotatable relative to each other.

With this configuration, the arm member 30 rotatably rotates the first housing 10 and the second housing 20 from a reflected light measurement state (first state) in which an angle between a optical axis of the light L1 emitted on the measurement target S and the optical axis of the measurement light L2 output from the measurement target S is an acute angle to a transmitted light measurement state (second state) in which the optical axis of the light L1 to be emitted on the measurement target S and the optical axis of the measurement light L2 output from the measurement target S are coaxial. As a result, the angle between the optical axis of the measurement light L2 and the optical axis of the light L1 can be changed to any angle. Note that the reflected light measurement state is a state where the reflected light of the light L1 reflected by the measurement target S can be measured (reflected light measurement) as the measurement light L2. The transmitted light measurement state is a state where the transmitted light of the light L1 transmitted through the measurement target S can be measured (transmitted light measurement is possible) as the measurement light L2.

The first light shielding cover 40 is a rectangular parallelepiped cup-like member and includes an internal space R3. The first light shielding cover 40 has its one side open, defined as an opening 41. An end portion on the opening 41 side of a bottom portion 42 of the first light shielding cover 40 is attached to an outer surface 29 facing the abutment surface 24 in the second housing 20 via a hinge 43 having a rotation axis in the X-direction. This configuration allows the first light shielding cover 40 to be openable and closable with respect to the second housing 20 so as to pivot in a rotation direction around the X-axis with reference to the hinge 43 (refer to FIGS. 2 and 4). The first light shielding cover 40 has a light shielding property. Here, the first light shielding cover 40 is formed of resin having high light shielding property so as not to obstruct wireless communication by the wireless communication unit 22a.

Closing the first light shielding cover 40 in a case where the arm member 30 is in the reflected light measurement state would allow the first light shielding cover 40 to cover the optical path of the light L1 from the first opening 12 to the measurement target S, the first housing 10, and the arm member 30 so as not to be exposed to the outside (refer to FIG. 5). In other words, closing the first light shielding cover 40 would allow the optical path of the light L1 from the first opening 12 to the measurement target S, the first housing 10, and the arm member 30 to be accommodated in the internal space R3 and shielded from the outside.

In the first light shielding cover 40 in the closed state, the end surface constituting the opening edge portion is flush with the abutment surface 24 (located on a same plane). In the first light shielding cover 40 in the closed state, the opening 41 communicates with the recess 25 via the cutout 26. The first light shielding cover 40 includes a pair of extending walls 45 extending in the Y-direction from the opening 41 in a closed state and overlapping on the outer side in the X-direction of the second housing 20 (refer to FIG. 4). This configuration enhances the light shielding property of the first light shielding cover 40.

As illustrated in FIGS. 1 and 5, the wireless communication unit 22a of the spectroscopic measurement device 1 can wirelessly communicate with a wireless gateway 71 connected to the network N. The wireless communication unit 22a of the spectroscopic measurement device 1 transmits the measurement result of the spectrometer 21 onto the network N via the wireless gateway 71. Furthermore, the wireless communication unit 22a of the spectroscopic measurement device 1 receives a control signal for controlling the light source 11 from the network N via the wireless gateway 71.

As illustrated in FIG. 1, the data processing server 50 is connected to the network N. The data processing server 50 receives the measurement result of the spectrometer 21 from the network N. The data processing server 50 is a measurement result processing device that performs various data processing related to the received measurement result. The data processing server 50 performs at least one of data analysis, data calculation, and data accumulation on the basis of the received measurement result. For example, the data processing server 50 calculates and accumulates optical properties such as chromaticity and fluorescence properties of the measurement target S. The data processing server 50 transmits the processing result on the network N. The data processing server 50 constitutes a cloud server.

The mobile information terminal 60 is a control terminal having an interface such as a touch panel. An example of the mobile information terminal 60 is a tablet terminal. The mobile information terminal 60 is not particularly limited, and may be a smartphone, a personal computer, or the like. The mobile information terminal 60 generates a control signal to control the light source 11 in accordance with operation (input to the interface) by an operator.

The mobile information terminal 60 is capable of wireless communication with the wireless gateway 72 connected to the network N. The mobile information terminal 60 transmits the generated control signal onto the network via the wireless gateway 71. The mobile information terminal 60 receives various processing results of the data processing server 50 from the network N via the wireless gateway 71. The mobile information terminal 60 displays the received processing result on the interface. This allows the operator to confirm or refer to the processing result.

Next, a method for performing reflected light measurement of the measurement target S using the spectroscopic measurement device 1 in the spectrometry system 100 will be described.

As illustrated in FIG. 2, first, in a state where the first light shielding cover 40 is opened, the abutment surface 24 of the second housing 20 is abutted against the measurement target S so as to be pressed against it. This abutment operation regulates and hold the position of the measurement target S. At the same time, the arm member 30 is rotated about the rotation axis G at the proximal end side to adjust the relative angle of the first housing 10 with respect to the second housing 20 to a certain angle, so as to adjust the emission angle of the light L to the measurement target S to a desired angle.

Figure 4:
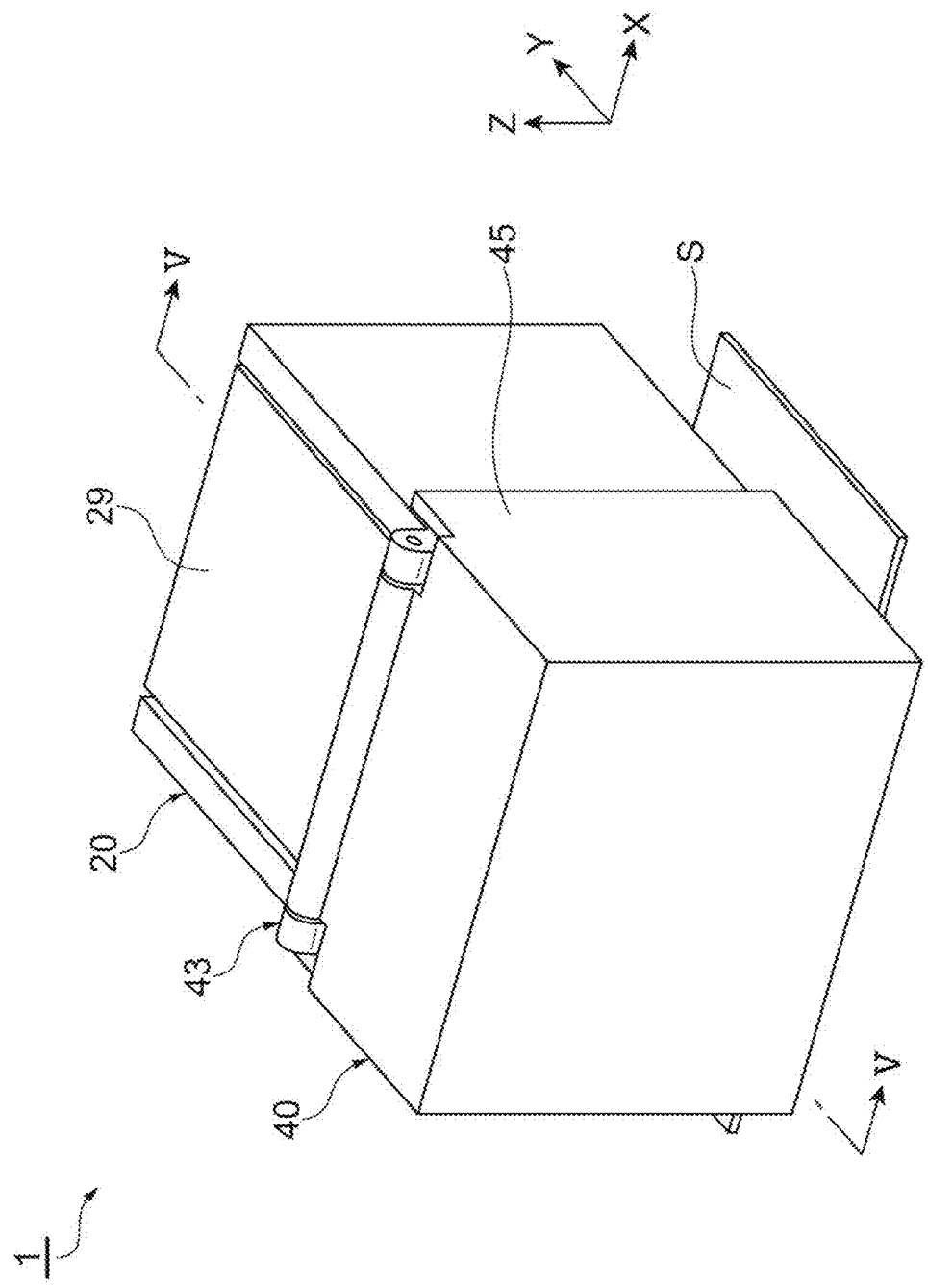
FIG. 4 is a perspective view illustrating a state where the first light shielding cover is closed in the spectroscopic measurement device of FIG. 1.

Subsequently, as illustrated in FIGS. 4 and 5, the first light shielding cover 40 is rotated about the hinge 43 and is closed, and then, the optical path of the light L1 from the first opening 12 to the measurement target S, the first housing 10, and the arm member 30 are covered with the first light shielding cover 40. This leads to light shielding of the optical path of the measurement system from ambient light.

Subsequently, as illustrated in FIGS. 1 and 5, an operator operates the mobile information terminal 60 so as to transmit a control signal for driving the light source 11 from the mobile information terminal 60 to the network N. In response to this, the wireless communication unit 22*a* of the spectroscopic measurement device 1 receives the control signal from the network N, and then, the light source control unit 22*b* controls the light source 11 to emit the light L1 from the light source 11 on the basis of the control signal. The emitted light L1 passes through the first opening 12 to be emitted on the measurement target S at a desired light emission angle. Measurement light S2 as the reflected light travels toward the second opening 28 in the Z-direction and then received and measured by the spectrometer 21.

The measurement result of the spectrometer 21 is transmitted to the data processing server 50 via the network N by the wireless communication unit 22*a*. The data processing server 50 performs data processing of the received measurement result. The data processing server 50 transmits the data processing result to the mobile information terminal 60 via the network N. As a result, the processing result received on the mobile information terminal 60 is displayed on the interface.

As described above, in the spectroscopic measurement device 1, the arm member 30 is appropriately rotated so that its distal end side swings around the rotation axis G on the proximal end side in a state where the second housing 20 in contact with the measurement target S so that the relative angle of the first housing 10 with respect to the second housing 20 can be changed as desired, eventually enabling a light emission angle of the light L1 with respect to the measurement target S to be changed as desired. That is, this makes it possible to easily perform spectrometry of emitting light L1 to a measurement target S at a desired light emission angle.

In the spectroscopic measurement device 1, the rotation axis G of the arm member 30 extends along the X-axis orthogonal (intersecting) with the optical axis of the measurement light L2 from the measurement target S. With this configuration, it is possible to suppress elongation of the optical path of the light L1 from the light source 11 to the measurement target S (distance between the light source 11 and the measurement target S) in a case where the arm member 30 is rotated to change the emission angle of the light L1 with respect to the measurement target S. The longer the optical path of the light L1, the lower the efficiency (sensitivity) becomes in inverse proportion to the square of the distance, and this would increase the noise included in the spectrometry. Therefore, this effect of suppressing elongation of the optical path of the light L1 (in other words, reducing the optical path of the light L1) is particularly effective in implementing accurate spectrometry.

In the spectroscopic measurement device 1, the rotation axis G of the arm member 30 extends along the X-axis orthogonal to (intersecting) the optical axis of the measurement light L2 from the measurement target S and orthogonal to (intersecting) the optical axis of the light L1 emitted on the measurement target S. With this configuration, it is possible to further suppress elongation of the optical path of the light L1 from the light source 11 to the measurement target S in a case where the arm member 30 is rotated to change the emission angle of the light L1 with respect to the measurement target S.

In the spectroscopic measurement device 1, the first housing 10 is provided so as to be slidable in an extending direction of the arm member 30 on the distal end side of the arm member 30. In this configuration, by sliding the first housing 10 so as to come closer to the measurement target S in the extending direction of the arm member 30 in the spectrometry, it is possible to shorten the optical path of the light L1 from the light source 11 to the measurement target S.

In the spectroscopic measurement device 1, the second housing 20 includes the abutment surface 24 that regulates the position of the measurement target S. Pressing the abutment surface 24 against the measurement target S makes it possible to reliably hold the measurement target S, so as to secure the position of the measurement target S.

In the spectroscopic measurement device 1, closing the first light shielding cover 40 having light shielding property would be able to cover the optical path of the light L1 from the first opening 12 to the measurement target S, the first housing 10, and the arm member 30. This makes it possible to effectively shield external light.

The spectroscopic measurement device 1 makes it possible to implement a structure integrating all of a structure for adjusting the light emission angle of the light L as desired, a structure for holding the measurement target S, and a structure for shielding external light. This would be extremely advantageous for using the spectroscopic measurement device 1 as a portable device.

Since this spectrometry system 100 includes the above spectroscopic measurement device 1, it is possible to obtain the above-described effect of being capable of performing spectrometry of emitting the light L1 to the measurement target S at a desired light emission angle. Furthermore, the spectrometry system 100 includes the data processing server 50. The data processing server 50 receives, via the network N, and processes the measurement result of the spectrometer 21 of the spectroscopic measurement device 1. This makes it possible to have a configuration in which the spectroscopic measurement device 1 has no measurement result processing function, leading to downsizing of the spectroscopic measurement device 1. Using the data processing server 50 as the cloud server enables execution of large-scale data accumulation and large-scale computation difficult in the terminal.

The spectrometry system 100 includes the mobile information terminal 60. The mobile information terminal 60 generates a control signal of the light source 11 in accordance with the operator's operation and transmits the control signal to the wireless communication unit 22*a* of the spectroscopic measurement device 1 via the network N. In the spectroscopic measurement device 1, the light source 11 is controlled by the light source control unit 22*b* on the basis of the received control signal. This makes it possible to remotely control the light source 11 via the network N.

In the spectrometry system 100, the processing result of the data processing server 50 is transmitted to the mobile information terminal 60 via the network N and then displayed on the interface of the mobile information terminal 60. This makes it possible to refer to the processing result at a remote place via the network N.

Here, the spectroscopic measurement device 1 can perform transmitted light measurement in addition to the reflected light measurement. Specifically, the arm member 30 is rotated about the rotation axis G, so as to allow the first opening 12 to face the second opening 28 in the Z-direction. At the same time, the measurement target S is disposed between the pair of partition walls 27, so as to dispose the measurement target S between the first opening 12 and the second opening 28. In this state, the light L1 is emitted from the light source 11 to allow the measurement light S2 transmitted through the measurement target S to be received by the spectrometer 21.

That is, the arm member 30 of the spectroscopic measurement device 1 can relatively rotate the first housing 10 and the second housing 20 until the reflected light measurement state shifts to the transmitted light measurement state. This makes it possible to implement reflected light measurement and transmitted light measurement without losing compactness. Note that even in the case where the arm member 30 is in the transmitted light measurement state, the first light shielding cover 40 may be configured to cover the optical path of the light L1 from the first opening 12 to the measurement target S, the first housing 10, and the arm member 30.

Second Embodiment

Next, a spectroscopic measurement device 1B according to a second embodiment will be described with reference to FIGS. 7 to 11. In the description of the present embodiment, points different from the first embodiment will be described, and duplicate description will be omitted.

The spectroscopic measurement device 1B further includes a second light shielding cover (second light shielding body) 80. The second light shielding cover 80 is a rectangular parallelepiped cup-like member and includes an internal space R4. The second light shielding cover 80 includes, at its opening edge portion, a hinge 83 having a rotation axis in the X-direction. The second light shielding cover is joined with the opening edge portion of the first light shielding cover 40 via the hinge 83. This configuration allows the second light shielding cover 80 to be openable and closable with respect to the first light shielding cover 40 so as to pivot in a rotation direction around the X-axis with reference to the hinge 83 (refer to FIGS. 9 and 10). The second light shielding cover 80 has a light shielding property. Here, the second light shielding cover 80 is formed of resin having high light shielding property so as not to obstruct wireless communication by the wireless communication unit 22a.

Figure 11:
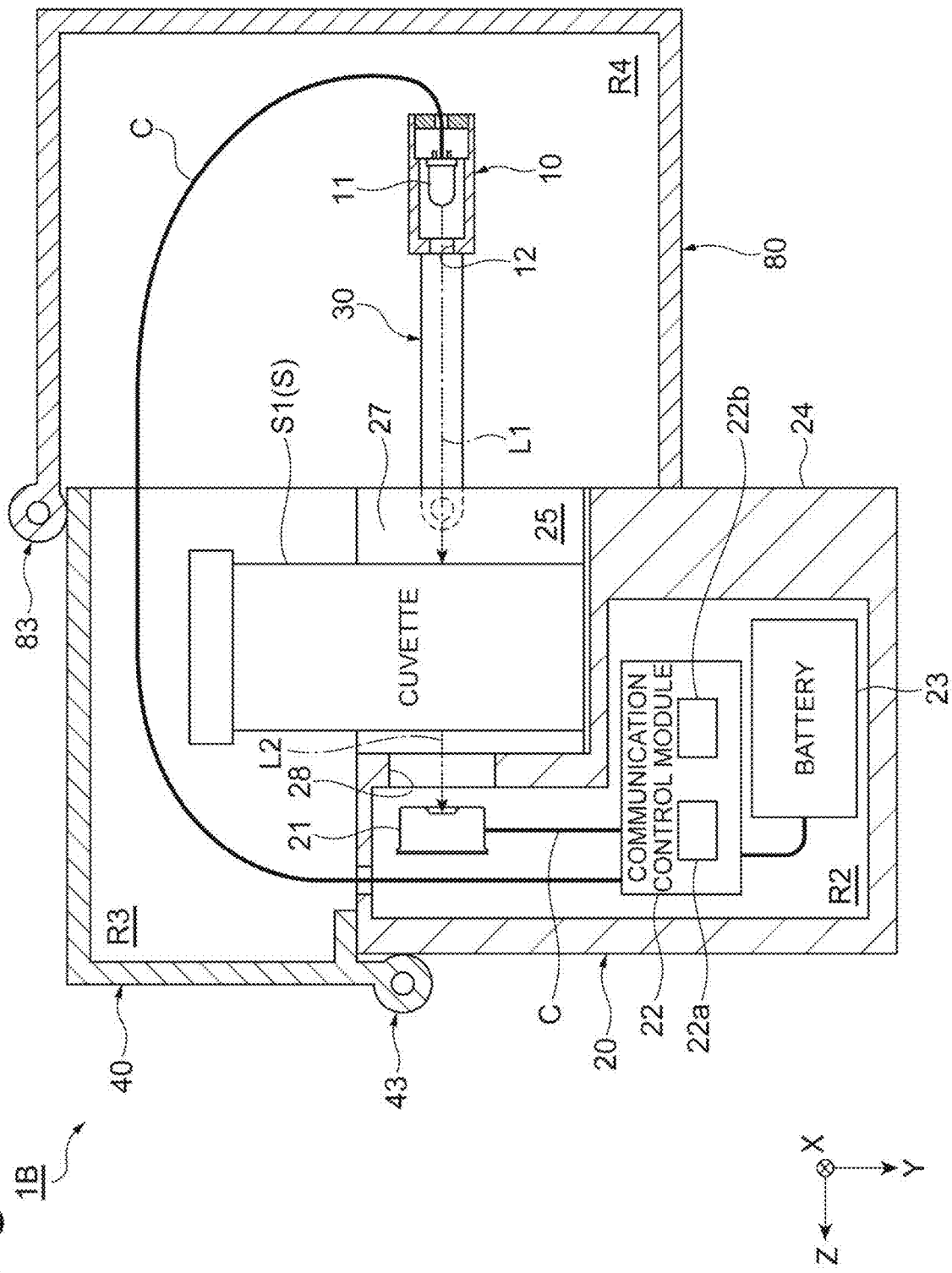
FIG. 11 is a diagram schematically illustrating a cross section taken along line XI-XI of FIG. 10.

Closing the first light shielding cover 40 and closing the second light shielding cover 80 in a case where the arm member 30 is in the transmitted light measurement state would allow the second light shielding cover 80 to cover, in cooperation with the first light shielding cover 40, the optical path of the light L1 from the first opening 12 to the measurement target S, the first housing 10, and the arm member 30 so as not to be exposed to the outside (refer to FIG. 11). In other words, closing the second light shielding cover 80 joined with the closed first light shielding cover 40 would allow the optical path of the light L1 from the first opening 12 to the measurement target S, the first housing 10, and the arm member 30 to be accommodated in the internal space R4 and shielded from the outside.

An end surface constituting the opening edge portion in the second light shielding cover 80 in a closed state abuts the abutment surface 24. The internal space R4 of the second light shielding cover 80 in the closed state communicates with the inside of the recess 25 and the internal space R3. The second light shielding cover 80 includes, in its closed state, a pair of extending walls 85 extending in the Z-direction from the opening edge portion and overlapping on the outer side in the X-direction of the second housing 20 and the first light shielding cover 40 (refer to FIG. 10). This configuration enhances the light shielding property of the second light shielding cover 80.

Next, a method of performing the transmitted light measurement of a cuvette S1 accommodating the measurement target S using the spectroscopic measurement device 1B will be described.

Figure 7:
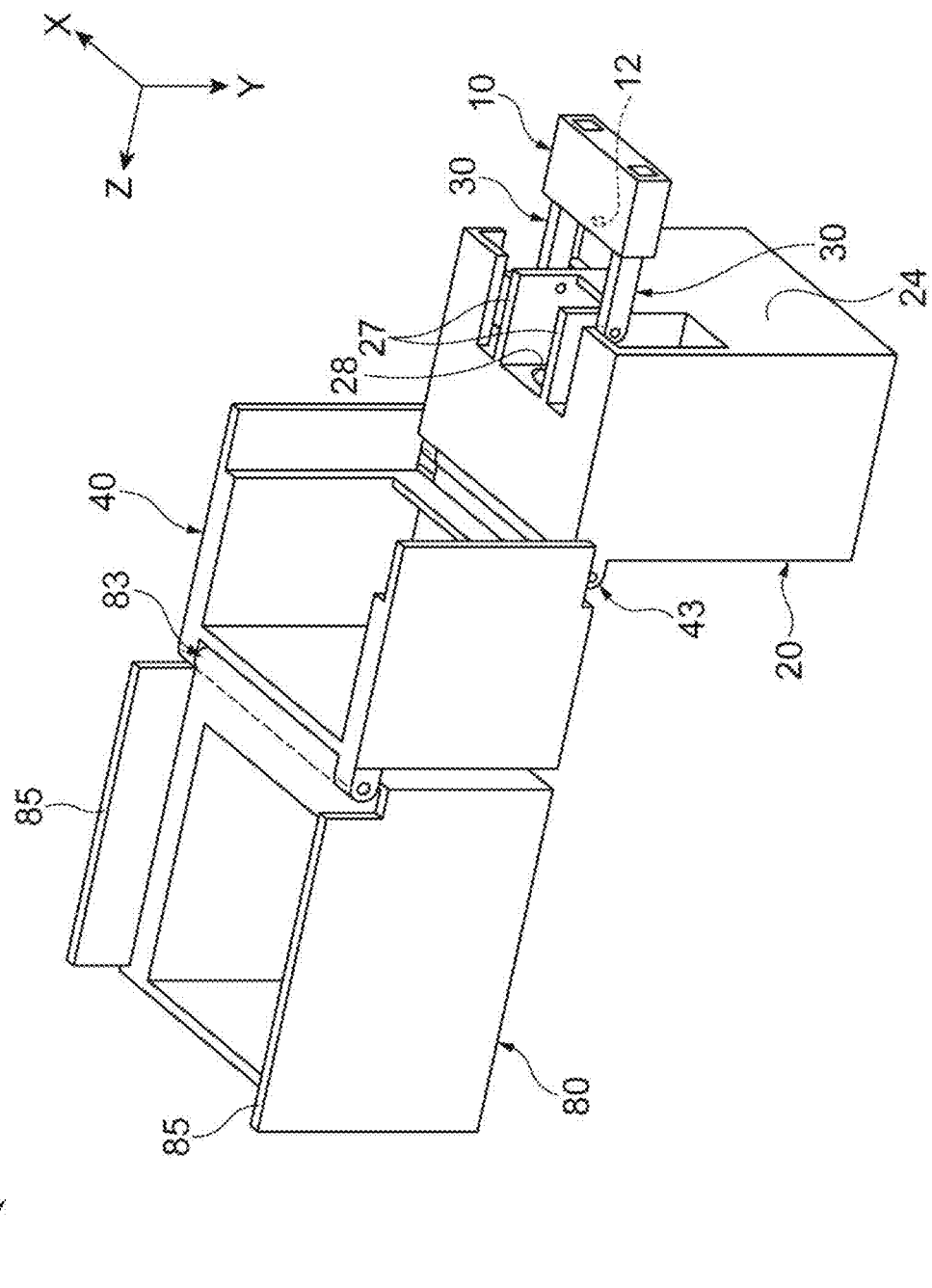
FIG. 7 is a perspective view illustrating a state where the first light shielding cover and the second light shielding cover are open in a spectroscopic measurement device according to a second embodiment.

As illustrated in FIG. 7, in a state where the first light shielding cover 40 and the second light shielding cover 80 are open, the arm member 30 is rotated about the rotation axis G so as to adjust the relative angle of the first housing 10 with respect to the second housing 20 to set the arm member 30 to the transmitted light measurement state. As a result, the first opening 12 is set to face the second opening 28 in the Z-direction, the light source 11 is set to face the spectrometer 21 in the Z-direction, and the optical axis of the light L1 is set coaxial with the optical axis of the measurement light L2 (refer to FIG. 11).

Figure 8:
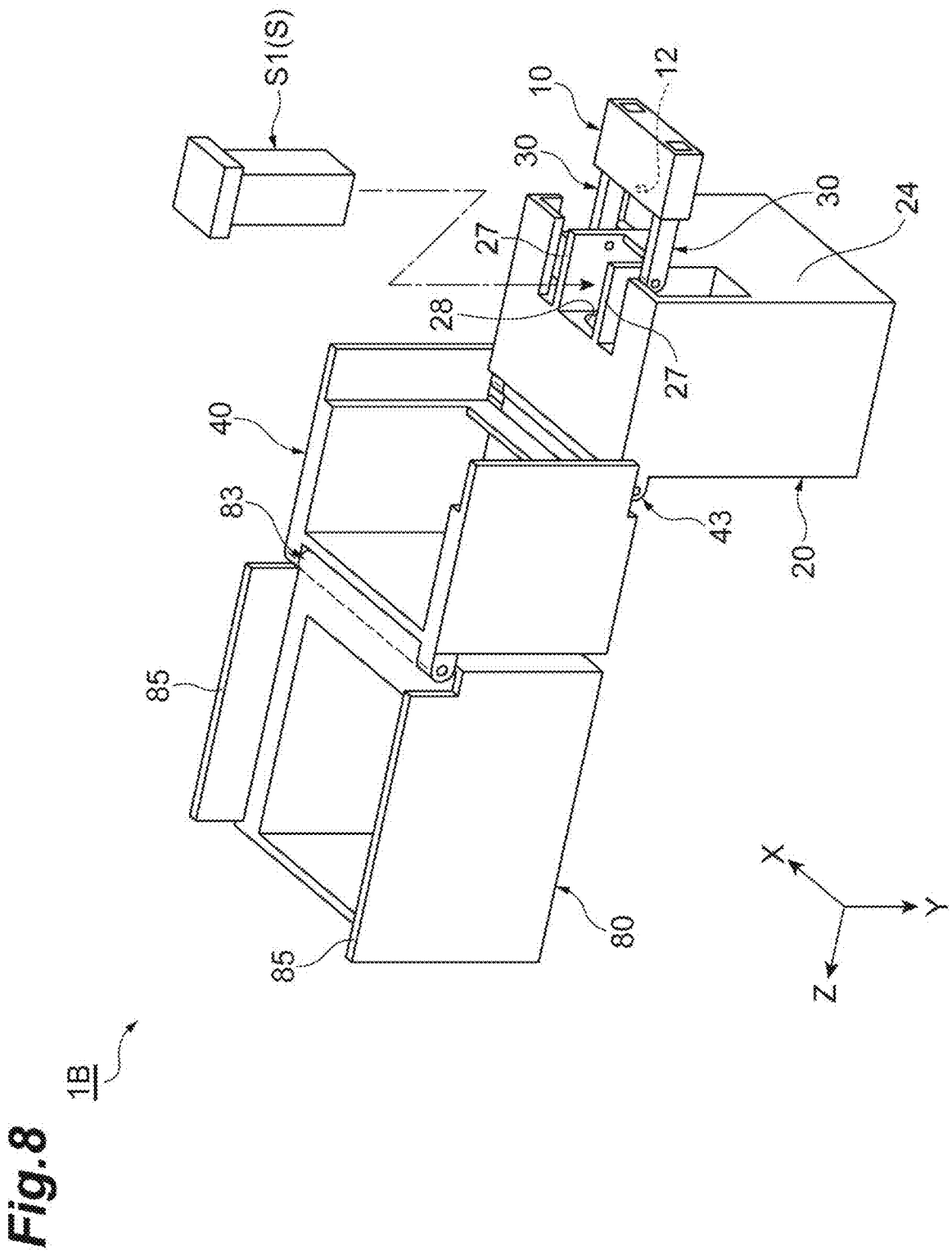
FIG. 8 is a perspective view illustrating a case where a cuvette is disposed in the spectroscopic measurement device of FIG. 7.

Subsequently, as illustrated in FIG. 8, the cuvette S1 is inserted between the pair of partition walls 27 of the second housing 20 in the Y-direction. The pair of partition walls 27 is used to function as a position regulator so as to hold the measurement target S in the X-direction between the pair of partition walls 27. With this state, the measurement target S is set between the first opening 12 and the second opening 28.

Figure 9:
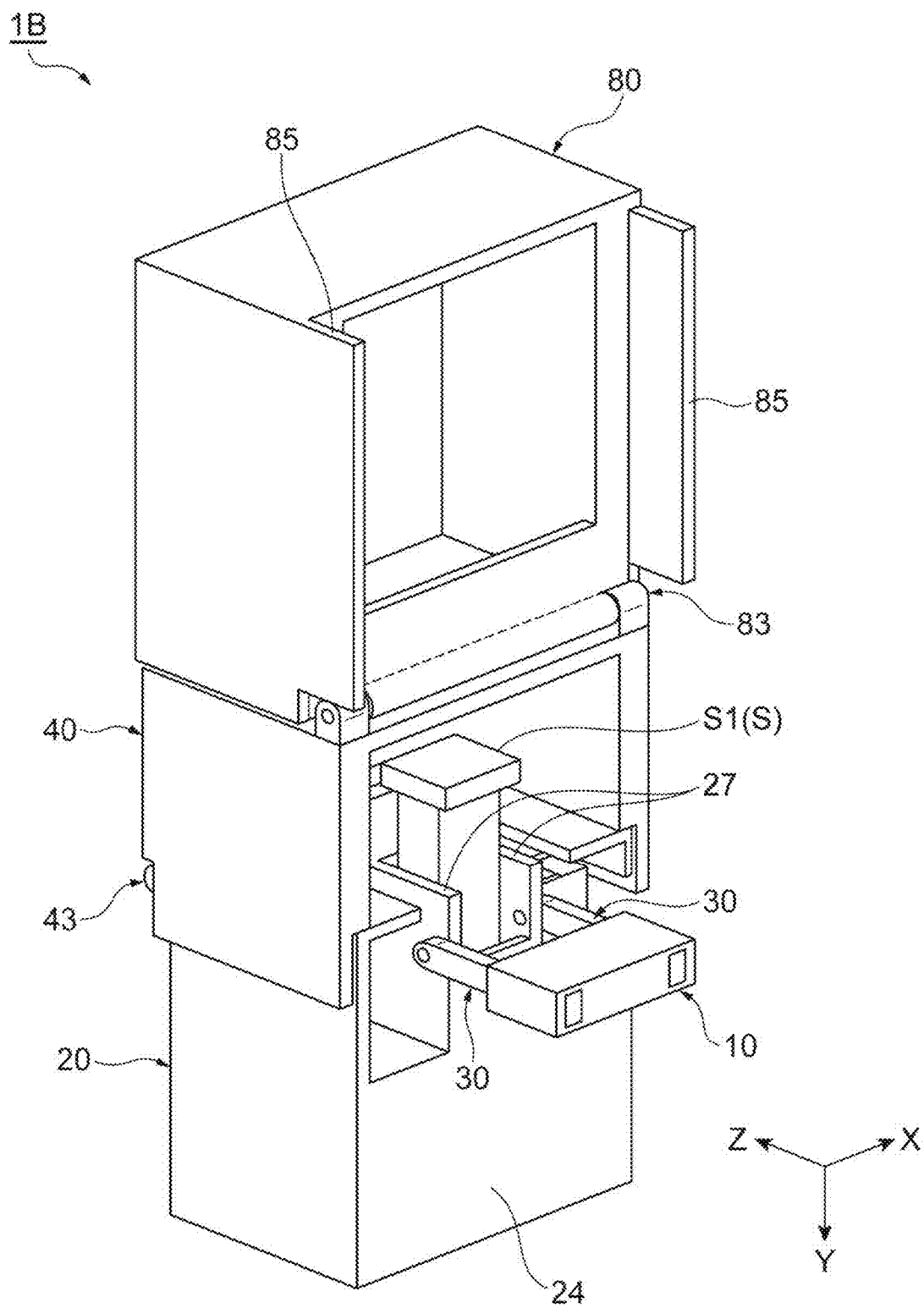
FIG. 9 is a perspective view illustrating a state where the first light shielding cover is closed and the second light shielding cover is open in the spectroscopic measurement device of FIG. 8.
Figure 10:
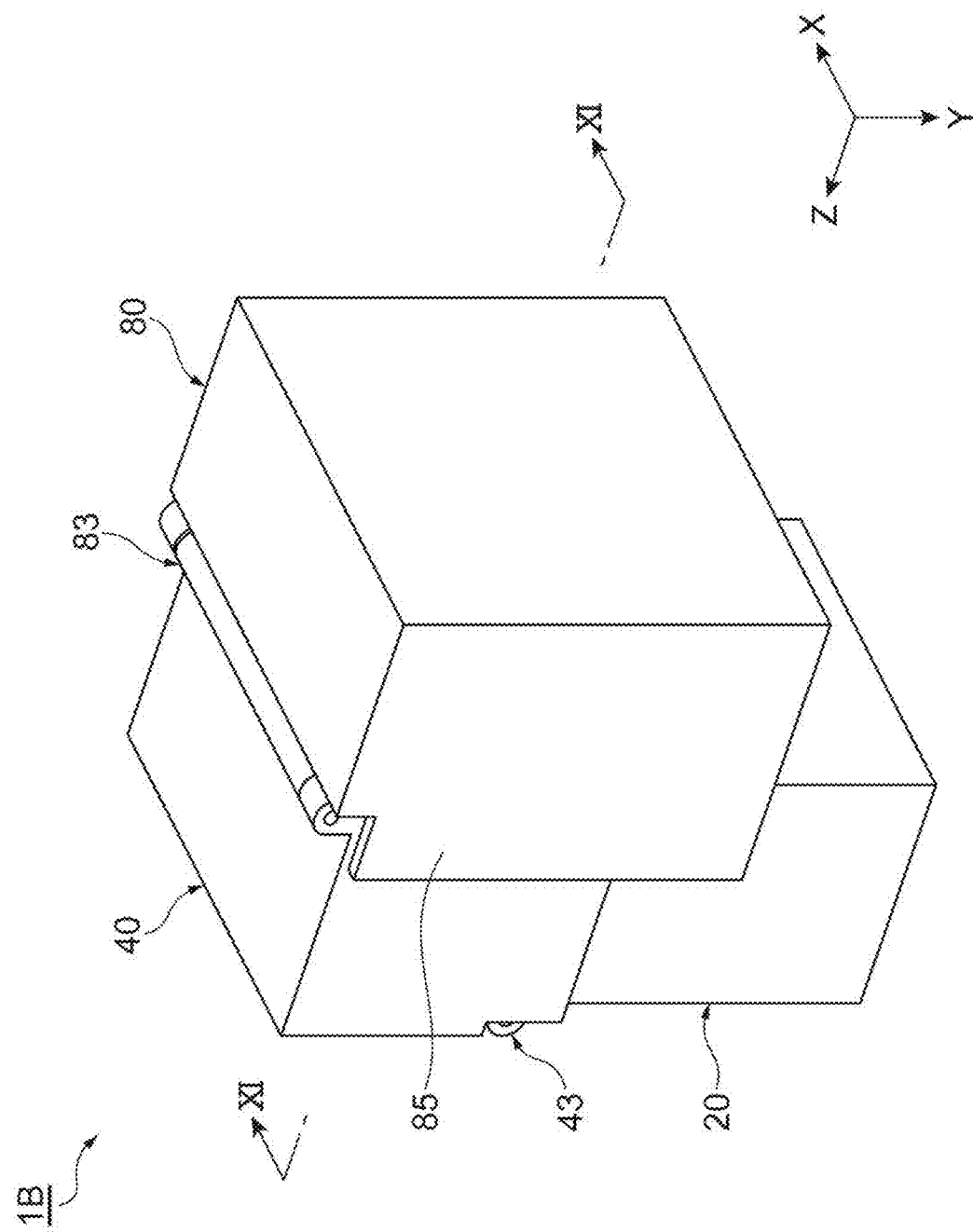
FIG. 10 is a perspective view illustrating a state where the first light shielding cover and the second light shielding cover are closed in the spectroscopic measurement device of FIG. 9.

Subsequently, as illustrated in FIG. 9, the first light shielding cover 40 is rotated around the hinge 43 and closed. As illustrated in FIGS. 10 and 11, the second light shielding cover 80 is rotated around the hinge 83 and closed. With this configuration, the second light shielding cover 80 that operates in cooperation with the first light shielding cover 40 covers the optical path of the light L1 from the first opening 12 to the measurement target S, the first housing 10, and the arm member 30, so as to shield the optical path of the measurement system from ambient light.

Subsequently, the light L1 is emitted from the light source 11. The emitted light L1 passes through the first opening 12 in the Z-direction, passes through the measurement target S in the cuvette S1, and then, the measurement light S2 as the transmitted light travels in the Z-direction toward the second opening 28, then received and measured by the spectrometer 21.

As described above, also in the spectroscopic measurement device 1B, it is possible to easily perform spectrometry of emitting the light L1 to a measurement target S at a desired light emission angle. Furthermore, closing the first light shielding cover 40 and the second light shielding cover 80 in a case where the arm member 30 is in the transmitted light measurement state in the spectroscopic measurement device 1B would allow the second light shielding cover 80 to cover, in cooperation with the first light shielding cover 40, the optical path of the light L1 from the first opening 12 to the measurement target S, the first housing 10, and the arm member 30. This makes it possible to effectively shield external light.

Note that it would of course be possible in the spectroscopic measurement device 1B to perform reflected light measurement similar to the above-described first embodiment by rotating the arm member 30 to set the state to the reflected light measurement state, in addition to performing the above transmitted light measurement. In this manner, in a state where the arm member 30 is in the transmitted light measurement state, it would be possible to cover the optical path of the light L1 from the first opening 12 to the measurement target S, the first housing 10, and the arm member 30 at least by closing the first light shielding cover 40.

While one embodiment of the present invention has been described hereinabove, the present invention is not limited to the above-described embodiments, but may include modifications and other applications obtained within the spirit and scope described in individual claims.

Figure 12:
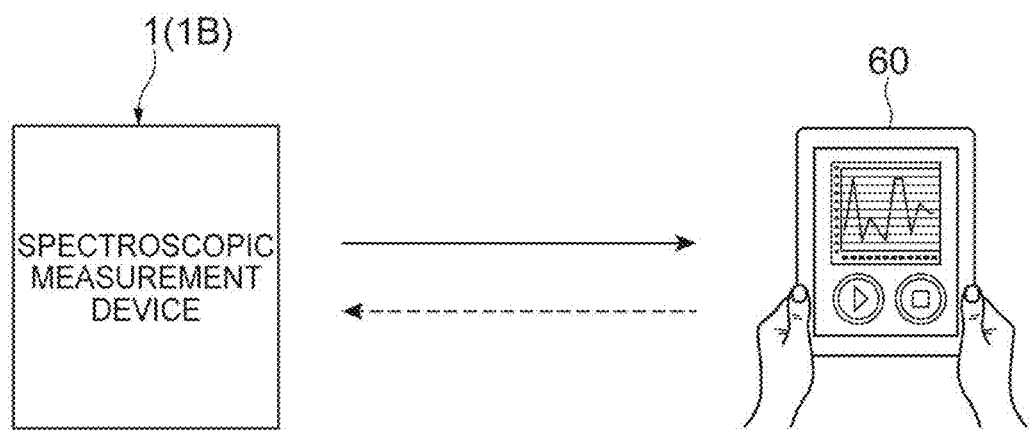
FIG. 12 is a configuration diagram illustrating a spectrometry system according to a modification.

As illustrated in FIG. 12, in the above embodiment, the spectroscopic measurement device 1 and the mobile information terminal 60 may be configured to be capable of directly communicating without going through a network. In this case, the measurement result of the spectrometer 21 of the spectroscopic measurement device 1 may be directly transmitted wirelessly from the wireless communication unit 22a to the mobile information terminal 60, and then, the measurement result may be processed by the mobile information terminal 60, and the processing result may be displayed on the interface of the mobile information terminal 60. Additionally, in this case, a control signal to control the light source 11 may be directly transmitted from the mobile information terminal 60 to the wireless communication unit 22a by radio. Here, the mobile information terminal 60 functions as a control terminal and a measurement result processing device.

In the above embodiment, a rubber layer may be provided on the abutment surface 24. This can enhance the light shielding property. In addition, since the abutment surface 24 can be abutted against the measurement target S via the rubber layer, the abutment surface 24 can be firmly pressed against the measurement target S, making it possible to strongly hold the measurement target S.

In the above embodiment, it is possible to perform fluorescence measurement of measuring the fluorescence generated in the measurement target S as the measurement light L2. Specifically, the fluorescence measurement may be performed instead of the reflected light measurement in a case where the arm member 30 is in the reflected light measurement state. Similarly, fluorescence measurement may be performed instead of the transmitted light measurement in a case where the arm member 30 is in the transmitted light measurement state.

INDUSTRIAL APPLICABILITY

It is possible to provide a spectroscopic measurement device and a spectrometry system capable of easily performing spectrometry of emitting light to a measurement target at a desired light emission angle.

REFERENCE SIGNS LIST 1, 1B Spectroscopic measurement device
10 First housing
11 Light source
12 First opening
20 Second housing
21 Spectrometer
22a Wireless communication unit (measurement result transmission unit, control signal reception unit)
22b Light source control unit
24 Abutment surface (position regulator)
27 Partition wall (position regulator)
28 Second opening
30 Arm member
40 First light shielding cover (first light shielding body)
50 Data processing server (measurement result processing device)
60 Mobile information terminal (measurement result processing device, control terminal)
80 Second light shielding cover (second light shielding body)
100 Spectrometry system
G Rotation axis
L1 Light
L2 Measurement light
N Network
S Measurement target

The invention claimed is:

1. A spectroscopic measurement device configured to emit light onto a measurement target to measure measurement light output from the measurement target corresponding to the light emission, the device comprising:
   a first housing having a light shielding property and configured to house a light source that emits light and having a first opening through which the light emitted from the light source passes;
   a second housing having a light shielding property and having a second opening through which the measurement light passes and configured to house a spectrometer that receives the measurement light that has passed through the second opening; and
   an arm member configured to relatively rotatably join the first housing and the second housing,
   wherein a proximal end side of the arm member is rotatably joined to the second housing,
   the first housing is attached to a distal end side of the arm member, and
   the proximal end side of the arm member is rotatably joined to the second housing via a rotation axis along an axis intersecting an optical axis of the measurement light output from the measurement target.

2. The spectroscopic measurement device according to claim 1,
   wherein the proximal end side of the arm member intersecting an optical axis of the light emitted onto the measurement target.

3. The spectroscopic measurement device according to claim 2,
   wherein the second housing includes an abutment surface configured to regulate a position of the measurement target.

4. The spectroscopic measurement device according to claim 2, comprising:
   a first light shielding body having a light shielding property and configured to cover the optical path of light from the first opening to the measurement target, the first housing, and the arm member.

5. The spectroscopic measurement device according to claim 1, wherein the first housing is provided so as to be slidable in an extending direction of the arm member on a distal end side of the arm member.

6. The spectroscopic measurement device according to claim 5,
wherein the second housing includes an abutment surface configured to regulate a position of the measurement target.

7. The spectroscopic measurement device according to claim 5, comprising:
a first light shielding body having a light shielding property and configured to cover the optical path of light from the first opening to the measurement target, the first housing, and the arm member.

8. The spectroscopic measurement device according to claim 1,
wherein the second housing includes an abutment surface configured to regulate a position of the measurement target.

9. The spectroscopic measurement device according to claim 8, comprising:
a first light shielding body having a light shielding property and configured to cover the optical path of light from the first opening to the measurement target, the first housing, and the arm member.

10. The spectroscopic measurement device according to claim 1,
wherein the arm member can relatively rotate the first housing and the second housing from a first state in which an angle between an optical axis of the light emitted on the measurement target and an optical axis of the measurement light output from the measurement target is an acute angle to a second state in which the optical axis of the light to be emitted on the measurement target and the optical axis of the measurement light output from the measurement target are coaxial.

11. The spectroscopic measurement device according to claim 10, comprising:
a first light shielding body having a light shielding property and configured to cover, in the first state of the arm member, an optical path of light from the first opening to the measurement target, the first housing, and the arm member; and
a second light shielding body having a light shielding property and configured to cover, in the second state of the arm member, the optical path of the light from the first opening to the measurement target, the first housing, and the arm member, in cooperation with the first light shielding body.

12. The spectroscopic measurement device according to claim 1, comprising:
a first light shielding body having a light shielding property and configured to cover the optical path of light from the first opening to the measurement target, the first housing, and the arm member.

13. A spectrometry system comprising:
the spectroscopic measurement device according to claim 1;
a measurement result transmitter provided in the spectroscopic measurement device and configured to transmit a measurement result of the spectrometer; and
a measurement result processor configured to receive the measurement result of the spectrometer from the measurement result transmitter directly or through a network and perform processing of the measurement result.

14. The spectrometry system according to claim 13, further comprising:
a controller configured to generate a control signal for controlling the light source in accordance with operation of an operator and transmit the control signal;
a control signal receiver provided in the spectroscopic measurement device and configured to receive the control signal from the control terminal directly or through a network; and
a light source control unit provided in the spectroscopic measurement device and configured to control the light source on the basis of the control signal received by the control signal receiver.

* * * * *